US012737104B2

(12) United States Patent
Quinton

(10) Patent No.: US 12,737,104 B2

(45) Date of Patent: Sep. 15, 2026

(54) GRAPHICAL USER INTERFACE FOR NON-HIERARCHICHAL FILE SYSTEM

(71) Applicant: Qing Quinton, Greenwich, CT (US)

(72) Inventor: Qing Quinton, Greenwich, CT (US)

( * ) Notice: Subject to any disclaimer, the term of this patent is extended or adjusted under 35 U.S.C. 154(b) by 0 days.

(21) Appl. No.: 16/659,337

(22) Filed: Oct. 21, 2019

(65) Prior Publication Data

US 2020/0159400 A1 May 21, 2020

Related U.S. Application Data

(63) Continuation-in-part of application No. 15/398,346, filed on Jan. 4, 2017, now Pat. No. 10,452,412, which is a continuation-in-part of application No. PCT/US2015/039269, filed on Jul. 6, 2015.

(60) Provisional application No. 62/099,579, filed on Jan. 4, 2015, provisional application No. 62/021,052, filed on Jul. 4, 2014.

(51) Int. Cl.
*G06F 3/04847* (2022.01)
*G06F 16/16* (2019.01)

(52) U.S. Cl.
CPC ........ *G06F 3/04847* (2013.01); *G06F 16/168* (2019.01)

(58) Field of Classification Search
CPC ............... G06F 16/168; G06F 3/04817; G06F 3/04847; G06F 3/048
See application file for complete search history.

(56) References Cited

U.S. PATENT DOCUMENTS

| | | | | |
|---|---|---|---|---|
| 5,303,388 | A * | 4/1994 | Kreitman | G06F 3/04817 715/848 |
| 6,002,401 | A | 12/1999 | Baker | |
| 6,317,739 | B1 * | 11/2001 | Hirata | G06F 16/2425 |
| 6,496,206 | B1 | 12/2002 | Mernyk et al. | |
| 6,507,836 | B1 * | 1/2003 | Nose | G06F 16/248 707/999.005 |
| 6,538,672 | B1 * | 3/2003 | Dobbelaar | H04N 21/4312 715/845 |
| 6,621,509 | B1 * | 9/2003 | Eiref | G06F 3/04815 715/848 |
| 6,636,250 | B1 * | 10/2003 | Gasser | G06F 3/0481 715/733 |
| 7,065,710 | B2 * | 6/2006 | Hayashi | G06F 3/0481 715/768 |

(Continued)

OTHER PUBLICATIONS

Deb Shinder Build Your Skills: Learn to manipulate file time stamps in Windows Mar. 24, 2003 17 pages (Year: 2003).*

(Continued)

*Primary Examiner* — Tuyetlien T Tran

(74) *Attorney, Agent, or Firm* — Danielson Legal LLC

(57) ABSTRACT

A graphical user interface (GUI) for presenting various data files and permitting users to interact with those data files. The GUI presents a variety of file identifiers, each file identifier associated with a data file, and permits the user to interact with data files by interacting with the file identifiers associated with those data files. Embodiments of the present invention identify individual data files using a plurality of time values, typically the time of the file's creation, the time of the file's access by a user, and the time of the creation of the particular copy of the file in the filesystem (a.k.a. "upload time").

18 Claims, 3 Drawing Sheets

(56) References Cited

U.S. PATENT DOCUMENTS

| | | | | |
|---|---|---|---|---|
| 7,075,550 | B2 | 7/2006 | Bonadio | |
| 7,149,729 | B2 * | 12/2006 | Kaasten | G06F 16/284 707/999.102 |
| 7,162,488 | B2 * | 1/2007 | DeVorchik | G06F 16/168 707/999.102 |
| 7,188,319 | B2 | 3/2007 | Amadio et al. | |
| 7,228,299 | B1 * | 6/2007 | Harmer | G06F 16/148 707/999.102 |
| 7,725,839 | B2 * | 5/2010 | Michaels | G06F 3/0482 715/767 |
| 10,332,297 | B1 * | 6/2019 | Vadodaria | G06F 3/0486 |
| 2002/0033848 | A1 * | 3/2002 | Sciammarella | G06F 3/0485 715/838 |
| 2002/0124256 | A1 * | 9/2002 | Suzuka | H04N 21/4334 725/55 |
| 2006/0010382 | A1 * | 1/2006 | Ejiri | G06Q 10/109 707/E17.142 |
| 2007/0124699 | A1 * | 5/2007 | Michaels | G06F 3/0482 715/837 |
| 2007/0130515 | A1 * | 6/2007 | Maas | G06F 3/04847 715/201 |
| 2007/0143324 | A1 * | 6/2007 | Eichhorst | G06F 16/168 |
| 2007/0233647 | A1 * | 10/2007 | Rawat | G06F 16/176 |
| 2007/0260529 | A1 * | 11/2007 | Furuno | G06Q 30/06 705/26.8 |
| 2008/0030734 | A1 | 2/2008 | Robert | |
| 2008/0111826 | A1 * | 5/2008 | Endrikhovski | G06F 16/904 345/589 |
| 2008/0307343 | A1 * | 12/2008 | Robert | G06F 3/04817 715/765 |
| 2009/0019398 | A1 | 1/2009 | Hansson et al. | |
| 2009/0043774 | A1 * | 2/2009 | Sudhakar | G06F 16/1873 707/999.009 |
| 2009/0106674 | A1 * | 4/2009 | Bray | G06F 16/156 715/762 |
| 2009/0112911 | A1 | 4/2009 | Chu | |
| 2009/0158214 | A1 * | 6/2009 | Arnold | G06F 16/438 715/830 |
| 2010/0185986 | A1 * | 7/2010 | Quintanilla | G06F 3/04817 715/835 |
| 2010/0312754 | A1 * | 12/2010 | Bear | G06F 16/134 707/685 |
| 2012/0144067 | A1 | 6/2012 | Hard et al. | |
| 2012/0185456 | A1 * | 7/2012 | Hart | G06F 3/0481 707/706 |
| 2012/0226662 | A1 * | 9/2012 | Swengler | G06F 16/13 707/634 |
| 2012/0297342 | A1 * | 11/2012 | Jang | G06F 3/04817 715/834 |
| 2013/0110775 | A1 * | 5/2013 | Forsythe | G06F 16/90 707/613 |
| 2013/0159361 | A1 * | 6/2013 | Maag | G06F 16/168 707/822 |
| 2014/0032502 | A1 * | 1/2014 | Kraley | G06F 40/197 707/663 |
| 2014/0280179 | A1 * | 9/2014 | Coleman | G06F 16/3323 707/740 |
| 2014/0320516 | A1 | 10/2014 | Son et al. | |
| 2019/0192390 | A1 * | 6/2019 | Lu | A61Q 19/08 |

OTHER PUBLICATIONS

Gibbs, Vector Analysis, 1901, Yale University Press, p. 40 (Year: 1901).*

Merriam-Webster Dictionary, Definition of Vector, https://www.merriam-webster.com/dictionary/vector (Year: 2023).*

Extended European Search Report for PCT/US2016/039269, dated Aug. 22, 2018, 10 pages.

Communication pursuant to Article 94(3) EPC, European Appl. No. 15814136.4 dated Oct. 13, 2023. 5 pages.

* cited by examiner

GRAPHICAL USER INTERFACE FOR NON-HIERARCHICHAL FILE SYSTEM

CROSS REFERENCE TO RELATED APPLICATIONS

The present application is a continuation-in-part of U.S. application Ser. No. 15/398,346, filed on Jan. 4, 2017 and issued as U.S. Pat. No. 10,452,412, which is a continuation-in-part of International (PCT) Patent Application No. PCT/US2015/039269, filed on Jul. 6, 2015, which claims the benefit of each of U.S. provisional application No. 62/021,052, filed on Jul. 4, 2014, and U.S. provisional application No. 62/099,579, filed on Jan. 4, 2015. The entire disclosure of each of these applications is incorporated by reference as if set forth in their entirety herein.

FIELD

The present invention generally relates to a user interface, and more specifically to a user interface that permits a user to easily select one or more files from a plurality of available files.

BACKGROUND

Traditional methods for organizing digital files are typically hierarchical in nature. Early text-based methods relied upon directories, sometimes nested within each other. The introduction of graphic user interfaces (GUI) for file organization brought the use of icons to represent individual files and folders to organize those icons. In some cases, folders could be nested. In some cases, but not always, folders had a one-to-one correspondence to file system directories.

Even tagging systems have their limitations, as it can be unclear to which of its various meaning an individual tag should take on or whether that tag should take its meaning of a noun, a verb, or something else altogether, hindering file search functionality.

As more aspects of our lives have gone digital, and as digital footprinting and life—logging become more popular, these traditional GUI elements have not scaled well to deal with large volumes of time stamps and metadata of data files.

Accordingly, there is a need for improved GUI approaches that permit the easy selection and manipulation of large numbers of digital files along with display of their timestamps and metadata.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

A data file in accord with the current invention consists of file data, i.e., the contents of the data file, typically generated by a human author, as well as various attribute data, i.e., various parameters describing the data file independent of the contents of the data file. Typical attribute data values are grouped into time (both system generated times such as upload time, creation time, modify time, access time and user defined times) description (using keywords), relationship (which includes related files, original source file etc.), geo location (where activities happened or places the content is about), provenance (author and non-author such as editor or source of origin), user (account holders), social metrics, ecommerce stats, and system metadata (file size, file version) etc. Within each attribute group, there can be multiple attributes.

Each attribute group, applied across one or more files, operates as a dimension along which those files may be organized, searched, etc., according to each file's attributes' title or value. For example, a file having a "description" attribute may be assigned the value "lunch" to indicate that the underlying file describes something that may be eaten for lunch. Another file having a "time" attribute may be assigned the value "lunch" to indicate that the underlying file describes something eaten or some activities performed at lunch time.

Embodiments of the present invention provide a graphical user interface (GUI) for presenting various data files and permitting users to interact with those data files. The GUI presents a variety of file identifiers, each file identifier associated with a data file, and permits the user to interact with data files by interacting with the file identifiers associated with those data files.

In particular, embodiments of the present invention identify individual data files using a plurality of time values, typically the time of the file's creation, the time of the file's access by a user, and the time of the creation of the particular copy of the file in the filesystem (a.k.a. "upload time"), although one of ordinary skill will recognize that other time values of interest may be used. This triplet of time values can be used as naming of the name space to organize and display files in chronological order, permitting interaction with files in a manner that parallels the ways that users live and work. Users may specify additional time values of interest (e.g., time of last backup) to be associated with one or more files in the file system and use the user defined time(s) as part of the time triplet naming, and operate the user interface elements described herein to sort and display the files according to these time values or part of or variation of these time values.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF DRAWINGS

Non-limiting and non-exhaustive embodiments are described with reference to the following figures in which.

In the drawings, like reference characters generally refer to corresponding parts throughout the different views. The drawings are not necessarily to scale, emphasis instead being placed on the principles and concepts of operation.

DETAILED DESCRIPTION

Figure 1:
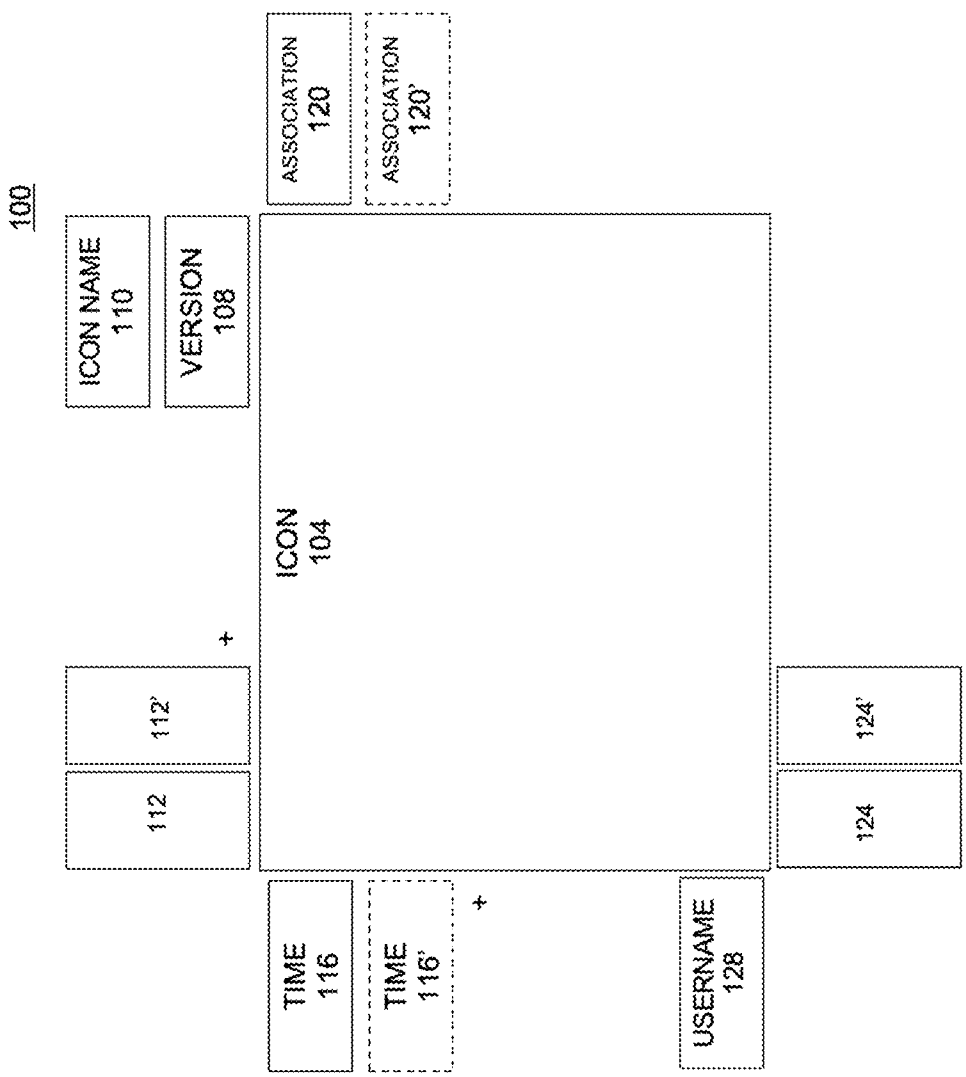
FIG. 1 depicts an example of an icon representing a file in a user interface in accord with the present invention.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Reference in the specification to a "time" should be understood to refer to a value similar to a UNIX® time value, i.e., a numerical value (such as an integer) that may be understood as referring to a particular time occurring on a particular day. The numerical value is typically incremented in an ascending order, such that a larger value relates to a later time than a smaller value.

Some portions of the description that follow are presented in terms of symbolic representations of operations on non-transient signals stored within a computer memory. These descriptions and representations are the means used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions that could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The processes and displays presented herein are not inherently related to any particular computer or other apparatus. Various general purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention. The embodiments of the systems, methods, and apparatuses described herein may be implemented in a number of different types of computing environments. These computing environments may include, but are not limited to, single-file systems, distributed file systems, software-defined storage environments, or the like. In some embodiments, the systems, methods, and apparatuses described herein may be implemented as a software-defined logic file storage layer.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

As discussed above, embodiments of the present invention offer a filesystem that identifies files using at least three time values. At least one of these time values is a system-generated value (such as a creation or upload time, modification time, access time, etc.) while one or more of the time values may be user-defined times of interest (e.g., a due date, a date of completion, start date, end date, meeting date, expiration date, departure date, etc.). These latter time values may be set by the system or the user with or without the aid of an application such as a calendar.

Each file may further be associated with one or more attributes defined by the user. Attributes may be arbitrarily defined and selected, such as times (system and user defined), descriptions (using keywords), relationships (e.g., with other files, purpose), geo locations, devices, provenances (e.g., content creator, source), user (e.g., user name, or user status such as family, friend, etc.), file properties, social metrics, ecommerce statistics, inventory, etc. These attributes may be designated as private, shared, or public, with non-public attributes only searchable by users having proper authorization or credentials. Attributes may be "position" sensitive, in the sense that a file may have multiple attributes having the same title with each attribute having its own separate and independent namespace. For example, a search for "lunch" in the "description" attribute having "position" #1 may not identify a file having a "description" attribute in "position" #2 having the value "lunch." These attributes may also be "dimension" sensitive. For example, a search for "lunch" in the "time" attribute may not identify a file having a "description" attribute of the same value "lunch" regardless of attribute position.

FIG. 1 presents an example of a file identifier 100 associated with a data file in embodiments of the user interface of the present invention. The identifier 100 may, in various embodiments, have a variety of components but will typically include at least an icon 104 and at least one indicator.

The icon 104 may take a variety of forms. It may be, for example, a graphic suggesting the content of the associated data file (e.g., a stylized document for a word processing file) or it may be a thumbnail representation of the actual content of the data file (e.g., a reduced size or reduced resolution version of an image file). In still other embodiments, discussed in greater detail below, the icon 104 may be an actual editable pane permitting a user to edit and otherwise interact with the contents of a data file (e.g., editing the text of a word processing document).

The at least one indicator may be any of a variety of indicators, but will typically be associated with a graphical representation of that indicator placed in proximity to the perimeter of the icon 104. As illustrated in FIG. 1, typical indicators include file version 108, icon name 110, associated keywords 112, time values 116, associated files 120, miscellaneous properties 124, and user name 128. It is to be understood, however, by one of ordinary skill, that an identifier 100 in accord with the present invention need not include graphical representations for all of these types of indicators; one or more indicators may suffice.

Generally speaking, an indicator provides a display of a file property and a way for a user to edit a displayed property and/or a way for a user to create a new property. For example, as discussed below, an associated file identifier 120 may specify a file that links to the file represented by the file identifier 100. Some embodiments may automatically generate blank indicators for new values when, e.g., a user manipulates a cursor into proximity of the file identifier 100; in some embodiments the user may manually create a new, blank indicator by selecting a plus sign or other icon in proximity to a plurality of existing indicators.

Indicators also provide a way for users to interact and control the display of various file identifiers 100. For example, file identifiers 100 ordered grouped according to a time property can be displayed in, e.g., ascending or descending order according to a particular file property by selecting the indicator associated with the property of interest. The information elements displayed can form a matrix showing how the information associated with property associated with the selected indicator changed with time.

Indicators may be displayed in a single column, a double column, a plurality of columns, etc., depending on the number of indicators and the room available for each file identifier 100 on the screen. When the content of an indicator is too large to be displayed inside an indicator, an abbreviated version of the content may be displayed and selecting the indicator may cause the full version of the content to be displayed in, e.g., a pane or a balloon.

The file version indicator 108 is used to track different versions of a data file. For example, a user can create a new file version by selecting the file identifier 100 associated with an existing version of the data file and then duplicating the existing version with a "copy and paste" operation. A new file identifier 100' sharing the properties of the existing file identifier 100 will be created sharing the properties of the existing file identifier 100 but having an incremented file version indicator 108. In another embodiment, the user may create a new file version by directly selecting and changing the value of the file version indicator 108. The existence of a file version indicator 108 and an associated file version property permits for the search and display of files satisfying a particular file version. For example, selecting a file version indicator 108 having a value of "2" may result in the display of icons 104 for other files also having a file version of "2".

The icon name indicator(s) 110 allow for the identification and display of files whose icons 104 bear the same icon name. Text can be entered or edited in an icon name indicator by the user. In some embodiments, the icon name may be the same as the name of the underlying data file associated with the displayed icon, and changing one may change the other and vice versa.

The keyword indicator(s) 112 allow for the identification and display of files using text tags, potentially text tags associated with particular indicators 112, 112', etc. Text can be entered or edited in a keyword indicator 112. Individual keyword indicator(s) 112 can be differentiated according to their location or perhaps an additional identifier (e.g., "first," "second," etc.).

Keyword indicator(s) 112 allow for selective search and display of particular files. A user may, e.g., request the display of files having a certain keyword in any keyword indicator 112, or in a specific keyword indicator 112, 112' (e.g., a keyword contained specifically in the "second" keyword indicator 112'). The files having a matching keyword in the specified keyword indicator 112 may be displayed according to their chronological order, as discussed below, or in another desired order. For example, selecting a keyword indicator 112 having a value of "LAKE" may result in the display of icons 104 for other files also associated with the "LAKE" keyword.

The number of keyword indicator(s) 112 associated with each file identifier 100 may be arbitrary in number, and additional indicator(s) 112 may be added manually or automatically as required. For example, the entry of text into a keyword indicator 112 may result in the creation, display and/or placement of another keyword indicator 112'.

The time value indicator(s) 116 can be associated with a variety of file time attributes, e.g., upload time, creation time, access time, etc., as discussed above. In contrast to the keyword value indicator(s) 112, the values in the time value indicator(s) 116 are typically automatically set by the embodiment and are not directly editable by the user, although the values associated with individual time value indicator(s) 116 may indirectly be changed by the user as the user, e.g., copies or edits a file.

In some embodiments, time value indicator(s) 116 are associated with the file version indicator 108 such that each new version of the underlying data file (e.g., created by saving an edited version of the file) is associated with a new set of time values concerning the creation, editing, etc. of the new version. Reverting the file to an earlier version may result in the automatic reversion of the associated time properties and time value indicator(s) 116 as well. Users interacting with the underlying data file may be able to view the various time properties associated with each version of the file as exposed through the time value indicator(s) 116.

In other embodiments, each time value indicator 116 has its own version such that, e.g., each local or remote access to the file updates the access time associated with the access time value indicator as well as incrementing the version of the access time value indicator 116; each creation of a new version of the file updated the upload time associated with the upload time value indicator as well as incrementing the version of the upload time value indicator 116, etc.

Additional time value indicators 116 can be added to a file identifier 100 as discussed above to enable user interaction, display, and sorting using other time properties associated with a file. These time value indicator(s) 116, for example those set by a user, may be edited by the user using, e.g., a calendar application. Selecting a time value indicator 116 may result in the display of icons 104 for other files also having a similar associated time value.

Association indicator(s) 120 are used to display references to other data files associated in some way with the data file represented by the file identifier 100. A data file may be associated with the represented data file by, e.g., dragging a file identifier 100' for the file to be associated such that it contacts the file identifier 100. In another embodiment, an associated file may be specified by, e.g., selecting the association indicator 120 and entering a URL specifying the file for association. Other association indicators 120 may contain hyperlinks or other associations contained with the data file represented by the file identifier 100. The association indicator 120 may be presented as an icon relating to the associated file.

In still other embodiments, associations between files may be created by the "drag and drop" of a representation of a file, e.g., another file identifier, so that it makes contact with the file identifier 100. Upon the completion of the operation, the association may be explicitly spelled out in the underlying data file and/or one or more association indicators 120.

Selecting an association indicator 120 may result in the display of a preview of the content of the file represented by the association indicator 120. The displayed preview may be the file identifier 100' for the file represented by the association indicator 120 when, for example, the associated file is associated with the inventive GUI as opposed to, e.g., a file present on a computer reached over a wide-area network such as the Internet.

Miscellaneous properties indicator(s) 124 provide a way to create and interact with various arbitrary file properties including not only conventional file property tags (author, file type, file size, file dimensions, file duration, file length etc.) but also social and e-commerce related file property tags (data metrics, project metrics, social metrics [e.g., Facebook "likes"], merchandising metrics [e.g., product price], etc.). For example, a user may specify a file of interest on a social network using a URL in a miscellaneous properties indicator 124 and the indicator 124 may track, e.g., the number of likes that the file of interest receives from the users of the social network or the number of views that the file receives. Selecting a miscellaneous indicator 124 may result in the display of icons 104 for other files also having a similar or matching property associated with that file.

The user name indicator 128 provides a way to identify and display files belonging to different users. In some embodiments the user name indicator 128 may also include an indicator displaying the sharing status associated with the underlying data file, e.g., an "N" for a private file, a "P" for a publicly-available file, an "S" for a file that is selectively shared with certain users or groups of users, etc.

Generally speaking, each indicator can be significant based on whether it is used to organize the file (i.e., its title), its position around the icon (i.e., its dimension), its position within the dimension (i.e., its location), and the actual value associated with the indicator (i.e., its value). An attribute's title and value may be the same therefore only one indicator may be presented as in a description attribute case and can be used interchangeably while all indicators listed in this paragraph can be used singularly or combined to describe a file's content.

For example, a keyword indicator may vary according to its value (e.g., "LAKE") and its location (e.g., second position on the top edge of the icon above the keyword indicator; the addition of location to the keyword indicator allows for multiple keyword indicators that share the same value but represent different classes or categories of files. The addition of dimensions to the attributes also allows for multiple classifications and categorizations using the same word based on the dimension the attribute belongs to. For example, a geo location indicator with a value of "LAKE" can be used to organize files generated at the "LAKE" or files with content that can be used for the "LAKE" or files showing activities performed at the "LAKE" apart from the representation of the above example.

Figure 2:
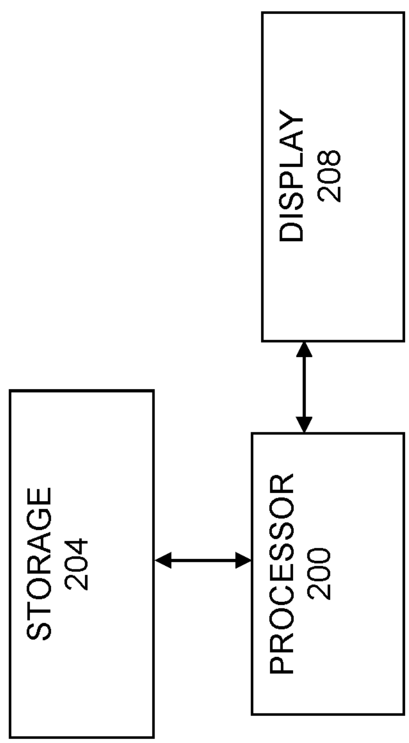
FIG. 2 is a block diagram of a computer configured to offer a graphical user interface (GUI) in accord with the present invention.

FIG. 2 is a block diagram of an exemplary system providing a GUI in accord with the present invention. In this embodiment, a processor 200 is in communication with storage 204 and a display 208.

The processor 200 may take a variety of forms in various embodiments. Exemplary processors suitable for use with the present invention include microprocessors handling the x86 instruction set or implementing an ARM-compatible architecture. Storage 204 includes any form of volatile or non-volatile storage suited to the storage of data files, icons, data defining various properties, etc. In particular, storage 204 will typically store one or more databases containing records associated with file identifiers and data files as discussed herein. Display 208 is suited to the display of computer-generated graphics to an end user, like a CRT or LCD display.

In operation, the processor 200 reads from and writes data to the storage 204 as a user interacts with graphics displayed on the display 208. In particular, the storage 204 may organize the data associated with the various displayed file identifiers and associated data files in a structured or unstructured database. For example, each data file and its associated filesystem properties can be stored as a row in a table. Each row can, in turn, be associated with one or more tables, with each table being associated with one or more indicators and their associated data. As a user adds additional keywords to a particular file identifier, the associated database table can be extended to add additional rows to accommodate those added keywords. The same is true of associations, time values, properties, etc. A similar operation may occur to the time attributes when, e.g., a file is edited a table associated with the row defining the file may add new rows to accommodate the edit time, etc.

Some embodiments of the invention may be implemented as a filesystem that natively organizes files according to the time triplets discussed above offered in conjunction with a graphical user interface that lets users interact with and organize files as discussed herein.

Still other embodiments may be implemented using a prior art filesystem that organizes files in directories according to their filenames. For example, in one such embodiment, each file may have a filename including a triplet of times and/or a version number as discussed above. An application offering a GUI in accord with the present invention can interact with these files using their filenames and decomposing and recomposing the filenames into their respective time values for sorting and interaction as described herein.

Individual attributes may be stored as metadata associated with a file in the filesystem, in a separate database, and, in some embodiments, in the filenames used by the filesystem to identify the file. For example, a file may be named "<CREATION TIME><MODIFICATION TIME><UPLOAD TIME><VERSION #><GEOLOCATION=LAKE>," where each of the <TIME> values are time values as discussed above.

Figure 3:
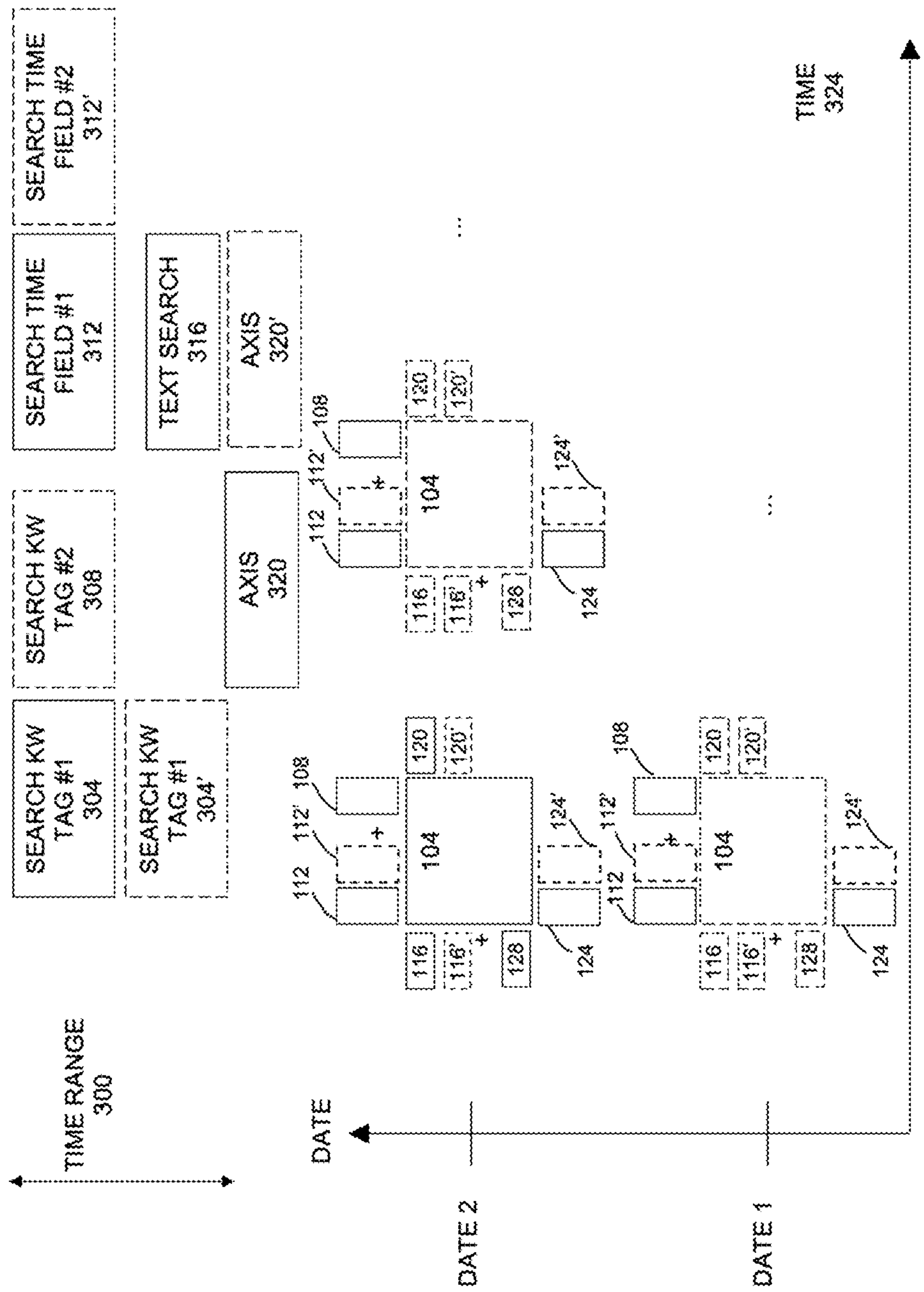
FIG. 3 depicts an interactive user interface for selecting and interacting with a plurality of files represented by the icons of FIG. 1.

FIG. 3 depicts one embodiment of an application user interface that permits a user to interact with a plurality of files presented using file identifiers in accord with the present interface.

In this embodiment, the display is divided into two sections: a control section with various user interface elements that can control which file identifiers are displayed, and a display section where the file identifiers are displayed in accord with the parameters specified by the user using the user interface elements of the control section or, in some embodiments, the interface elements offered by the file identifiers.

In this embodiment, the control section includes a time range selector 300, keyword search fields 304, 308; time search field 312; and text search field 316. It is understood by one of ordinary skill that the identity and placement of particular search fields is arbitrary and, in some embodiments, may be controlled by the user, who may opt to hide some or all of the fields to facilitate the display of file identifiers or add additional fields to facilitate the display of files with properties matching the specified search parameters.

The time range selector 300 receives a time range of interest from a user and searches for files having a time property falling within the specified range, displaying file identifiers for matching files to the user in the display section. In some embodiments, the time range may be closed, i.e., specifying both a start time or date and an end time or date. In other embodiments, the time range may be open, i.e., specifying one of a start or end time/date. In some embodiments, the time range selector 300 permits the user to specify the relevant time property to be searched (e.g., creation time, access time, upload time, etc.); in other embodiments all time properties are searched.

The keyword search fields 304, 308 permit the display of files that have been tagged with various keywords of interest using a keyword indicator. In the displayed embodiment, the keyword search fields are "location specific," in the sense that each keyword indicator has its own ordinal value, i.e., first keyword indicator 112, second keyword indicator 112', third keyword indicator 112", etc., and the first keyword search field 304 only searches for tags contained in the first keyword indicator 112, the second keyword search field 304 only searches for tags contained in the second keyword indicator 112', etc. In other embodiments, the keyword search filed is not "location specific," i.e., a keyword specified in a search field will match a keyword in any keyword indicator. In some embodiments an additional graphical user interface may be selected to change the behavior of one or more or all of the keyword search fields, i.e., toggling the keyword search fields of interest from "location specific" to not "location specific" in their behavior.

Keyword search fields 304, 308 may receive text entered by an end user, or the various keyword search fields may be prepopulated with tags selected from the set of tags associated with the various data files, e.g., a search field 304 with the most popular tag in the first keyword indicator 112. Multiple keyword search fields 304, 308 may be selected to narrow the set of displayed file identifiers corresponding to those data files matching all of the specified keywords either conjunctively (i.e., only files that each have all the specified keywords) or disjunctively (i.e., files that each have any of the plurality of specified keywords). As shown, each keyword search field may have multiple tags 304, 304' selected, again resulting in the display of file identifiers corresponding to those data files matching the specified tags conjunctively or disjunctively.

Time search fields 312 permit the user to specify time values for particular data files of interest. Each time search field 312 may receive a specified time value or range and then restrict the file identifiers displayed to files having a time field with a value matching the specified time value. In some embodiments, the time search field 312 or an additional user interface element may let the user specify a particular time field that must match the specified time value, e.g., creation time, access time, upload time, etc. Matching files are typically displayed in ascending or descending order The text search field 316 receives text from a user and searches for one or more of file names, file properties, and file contents matching the received text, displaying file identifiers for matching files to the user in the display section.

Each of the search fields may be used disjunctively or conjunctively, e.g., specifying a field with a certain keyword tag, a certain upload time, containing a certain text phrase, falling within a certain time range, etc.

The display section organizes and displays file identifiers of interest specifying the criteria specified by the user in the control section. In particular, file identifiers are organized and displayed along axes that are associated with a particular time field of interest. For example, specifying a value or range for a creation time will result in the display of one or more file identifiers organized by creation time in, e.g., a horizontal or vertical line. Specifying a value or a range for an access time will result in a display of file identifiers for matching files organized by access time in, e.g., a horizontal or vertical line.

If the user does not specify a time value or range, then the user interface may default to the display of file identifiers in an axis according to, e.g., upload time. File identifiers displayed along an axis may be scrolled in a manner known to the art to permit the user to peruse the various data files. In some embodiments, axis buttons 320 permit the user to specify which time property (access time, creation time, upload time, etc.) is used to display file identifiers in the default orientation.

In some embodiments, additional user interface elements permit the user to restrict the file identifiers displayed to, e.g., data files having a certain creator (like the current user of the interface), having a certain sharing status (private, public, shared, etc.), having a certain file name, having a certain name associated with an identifier icon, etc.

In the illustrated embodiment, the displayed file identifiers 100 retain all of the functionality discussed above in connection with FIG. 1. For example, the keyword indicators 112 associated with a particular file identifier 100 display the text tags associated with that file identifier 100 and the underlying data file, and also permit the user to specify additional text tags to be associated with that indicator 100 and file.

Selecting a displayed icon 104 may result in the display of file identifiers having a matching thumbnail. This provides a convenient way to display all versions of a particular file, or a particular file and any copies thereof. In other embodiments, selecting the icon 104 may result in the display of one or more additional icons 104' associated with data files having the same name as the data file associated with the selected icon 104.

Additionally, the displayed file identifiers 100 offer functionality that is duplicative of user interface elements 300-20. For example, selecting a time value indicator 116 may cause the file identifiers to be organized according to that time property, much like the selection of an axis button 320; the axis button 320 may be shaded or otherwise change its state to indicate the equivalence of these two operations. Selecting a keyword indicator 112 may cause the file identifiers having a matching keyword tag to be displayed along a time axis, similar to the keyword tag search 304, 308; again, the equivalent user interface elements may be shaded or otherwise change state to demonstrate the equivalence of those operations. The various user interface elements 300-20 and file identifier elements 108-24 may be utilized at the same time.

Selecting a file version indicator 108 on a particular file identifier 100 may result in the display of one or more file identifiers 100 associated with different data files but having the same version number. Those file identifiers 100 may be further restricted according to time, keyword tag, file name, etc. as discussed above.

Similar operations are true of the other components in the file identifier 100. Selecting a user name indicator 128 results in the display of file identifiers 100 for data files owned by that user. Selecting a file property 124 results in the display of file identifiers 100 for data files having that property.

As discussed above, all of these selection features, both in the control section and in the individual file identifiers may be utilized in combination to display file identifiers for various sets and subsets of interest.

As embodiments of the present invention utilize time values to uniquely identify file identifiers (i.e., typically a triplet of upload time, creation time and access time as discussed above), selecting a file version indicator 108 on a particular file identifier 100 in conjunction with one or more time value indicator(s) 116 may result in the display of one or more file identifiers 100 associated with various versions of the underlying data file.

Data files represented in the GUI of the present invention may be manipulated in ways known to the prior art in connection with conventional user interfaces. For example, the creation of a new data file will typically result in the creation of a new file identifier with an icon appropriate to the filetype and one or more blank attribute indicators. The creation of a new data file from an existing data file will typically result in the creation of a new file identifier sharing an icon and one or more attribute indicators with the file identifier of the existing data file and so on. Attribute indicators and file properties may be completed by a user selecting desired values from a variety of templates, or by entering the values de novo using a keyboard, mouse, etc.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

What is claimed is:

1. A method of providing a filesystem, the method comprising:

receiving at an interface a first data file for storage in a computing environment; and assigning, using a processor executing instructions stored on memory, to the first data file a first list of numbers that is unique to the first data file and serves as a unique identifier to identify and access the first data file, and displaying the first list of numbers in proximity to a perimeter of a first icon that is associated with the first data file, wherein the first list of numbers includes a plurality of time values that are each associated with a different time attribute associated with the first data file, wherein a new version of the first data file has a second list of numbers that is different than the first list of numbers, the second list of numbers including a plurality of time values that are each associated with a different attribute associated with the new version of the first data file.

2. The method of claim 1 wherein the first list of numbers includes a first time value, a second time value, and a third time value.

3. The method of claim 2 wherein at least one of the first, second, and third time values is selected from the group consisting of upload time of the first data file, creation time of the first data file, and access time of the first data file.

4. The method of claim 2 further comprising:

displaying a first selectable indicator associated with the first time value in proximity to the perimeter of the first icon;

displaying a second selectable indicator associated with the second time value in proximity to the perimeter of the first icon; and displaying a third selectable indicator associated with the third time value in proximity to the perimeter of the first icon.

5. The method of claim 2 wherein the first time value is generated by the processor, and at least one of the second time value or third time value are generated by a user.

6. The method of claim 2 wherein the second time value is a user-defined time value, and the method further includes:

receiving a user interaction with the second time value;

updating the second time value based on the user interaction; and storing the updated second time value in the computing environment.

7. The method of claim 1 wherein the first list of numbers and the second list of numbers present the attributes in a defined order.

8. The method of claim 1 further comprising:

receiving at the interface a second data file for storage in the computing environment;

assigning, using the processor, to the second data file a second list of numbers that is unique to the second data file and serves as a unique identifier to identify and access the second data file and represents a path to the second data file, wherein the second list of numbers includes a plurality of time values related to the second data file and is in proximity to a perimeter of a second icon associated with the second data file.

9. The method of claim 8 further comprising:

arranging the first icon and the second icon on the user interface based on at least one time value associated with the first data file and at least one time value associated with the second data file.

10. A filesystem comprising:

a processor and a memory storing instructions, the processor executing the instructions stored on the memory configured to:

display an interface for at least receiving a first data file for storage in a computing environment; and assign to the first data file a first list of numbers that is unique to the first data file and serves as a unique identifier to identify and access the first data file and represents a path to the first data file, and display the first list of numbers in proximity to a perimeter of a first icon that is associated with the first data file, wherein the first list of numbers includes a plurality of time values that are each associated with a different time attribute associated with the first data file, wherein a new version of the first data file has a second list of numbers that is different than the first list of numbers, the second list of numbers including a plurality of time values that are each associated with a different attribute associated with the new version of the first data file.

11. The filesystem of claim 10 wherein the first list of numbers includes a first time value, a second time value, and a third time value.

12. The filesystem of claim 11 wherein at least one of the first, second, and third time values is selected from the group consisting of upload time of the first data file, creation time of the first data file, and access time of the first data file.

13. The filesystem of claim 11 further comprising a user interface configured to:

display a first selectable indicator associated with the first time value in proximity to the perimeter of the first icon;

display a second selectable indicator associated with the second time value in proximity to the perimeter of the first icon; and display a third selectable indicator associated with the third time value in proximity to the perimeter of the first icon.

14. The filesystem of claim 11 wherein the first time value is generated by the processor, and at least one of the second time value or third time value are generated by a user.

15. The filesystem of claim 11 wherein the second time value is a user-defined time value, and the processor is further configured to:

receive a user interaction with the second time value, update the second time value based on the user interaction, and store the updated second time value in the single server environment.

16. The filesystem of claim 10 wherein the first list of numbers and the second list of numbers present the attributes in a defined order.

17. The filesystem of claim 10 wherein the interface is further configured to receive a second data file for storage in the computing environment, and the processor is further configured to assign to the second data file a second list of numbers that is unique to the second data file and serves as a unique identifier to identify and access the second data file and represents a path to the second data file, wherein the second list of numbers includes a plurality of time values related to the second data file and is in proximity to a perimeter of a second icon associated with the second data file.

18. The filesystem of claim 17 wherein the user interface is further configured to:

arrange the first icon and the second icon based on at least one time value associated with the first data file and at least one time value associated with the second data file.

* * * * *